J. E. PRUDDEN.
Thill-Coupling.
No. 70,358.
Patented Oct. 29, 1867
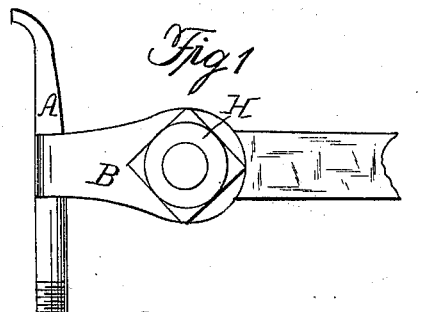
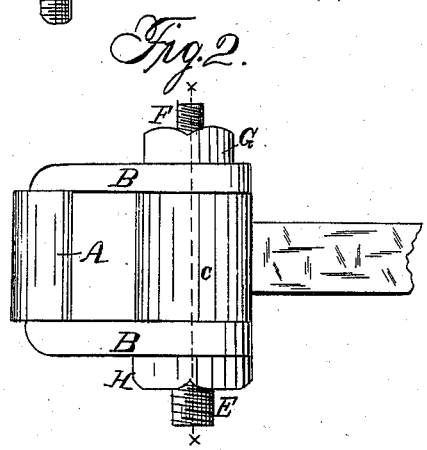
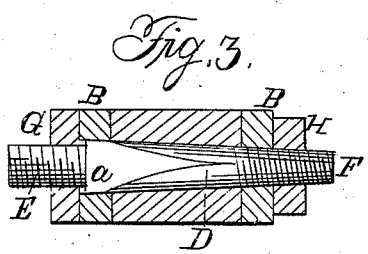
Witnesses
John H. Shumway
A. J. Tibbits
Inventor
J. E. Prudden.
By his Atty.
John E. Earle

United States Patent Office.

J. E. PRUDDEN, OF BIRMINGHAM, CONNECTICUT.

Letters Patent No. 70,358, dated October 29, 1867.

IMPROVEMENT IN CARRIAGE-SHACKLE.

The Schedule referred to in these Letters Patent and making part of the same.

TO ALL WHOM IT MAY CONCERN:

Be it known that I, J. E. PRUDDEN, of Birmingham, in the county of New Haven, and State of Connecticut, have invented a new Improvement in Carriage-Shackles; and I do hereby declare the following, when taken in connection with the accompanying drawings, and the letters of reference marked thereon, to be a full, clear, and exact description of the same, and which said drawings constitute part of this specification, and represent, in—

Figure 1, a side view,

Figure 2 a top view, and in

Figure 3 a section on line $x\ x$.

This invention relates to an improvement in a carriage-shackle whereby the coupling is tightened so as to prevent rattling, and consists in the arrangement, in combination with the shackle and coupling, of an adjustable conical bolt.

To enable others to construct my improvement, I will proceed to describe the same as illustrated in the accompanying drawings.

A is the carriage-clip, upon which is formed in the usual manner the ears B of the shackle, between which is fitted the coupling or shaft-iron C, the said coupling being bored out conically, as seen in fig. 3. D is the bolt, and is formed square upon its one end, $a$, and so as to fit a corresponding square opening through one ear of the shackle. From this square end the bolt tapers so as to correspond to the conical hole through the coupling. Each end E and F of the said bolt is threaded and provided with a nut, G H. The coupling C being placed in proper position between the ears, the bolt D is passed through, as seen in fig. 3, and the nut H turned, on drawing the bolt in, so as to closely fit and firmly hold the coupling; and when so fitted the nut G is placed upon the other end and turned hard down upon the shackle, the square end of the bolt preventing the bolt from turning while the nuts are being turned on. When the bolt or coupling has from use become worn it may be tightened by loosening the nut G and turning up the nut H, and it will be well at such times to turn the bolt D one-quarter around, so as to present a different bearing surface. When it is desirable to change the pole or shafts for another, take out the bolt D by removing the nut H, remove the shafts or pole, insert others, and replace the bolt. Thus it will be seen that I have produced a shackle readily adjustable, and by its peculiar construction prevented from rattling, without the intervention of India rubber or other elastic flexible material.

I do not wish to be understood as broadly claiming a conical bolt or bearing, as such is not new; but what I do claim as new and useful, and desire to secure by Letters Patent, is—

The herein-described shackle as an improved article of manufacture, consisting of the shackle B and coupling C, constructed and arranged with the conical bolt D, made square at its larger end, and provided with nuts G and H, so as to be adjustable, substantially in the manner herein described.

J. E. PRUDDEN.

Witnesses:
JOHN E. EARLE,
JOHN H. SHUMWAY.